March 23, 1937.  H. L. ADAMS  2,074,765
RUDDER
Filed Nov. 22, 1932
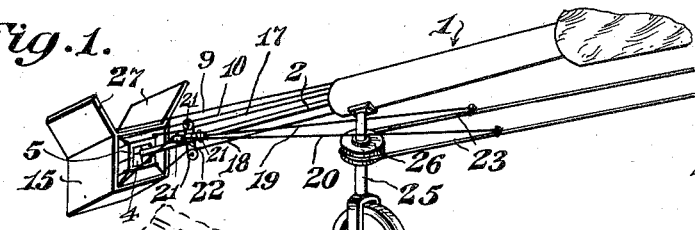
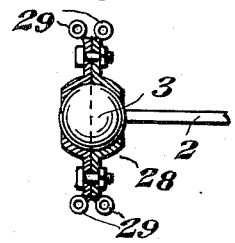
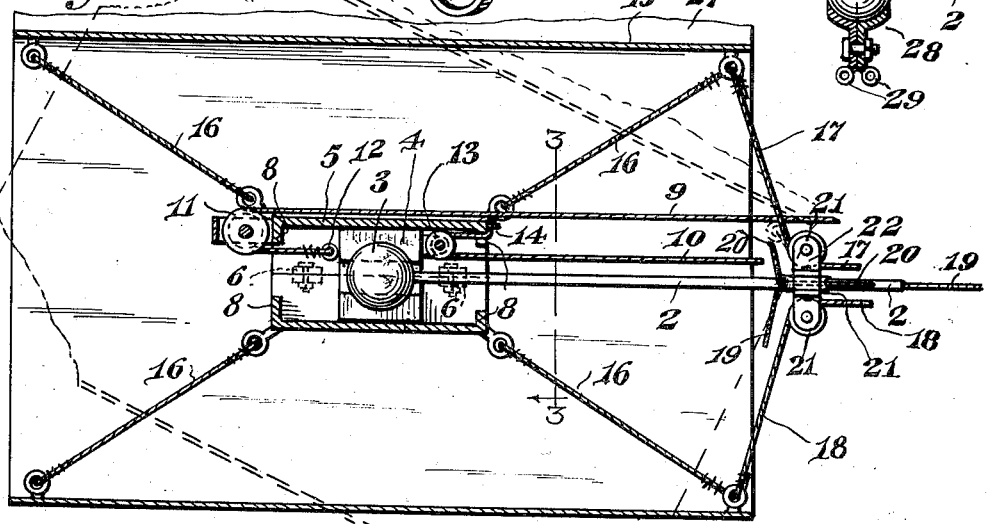
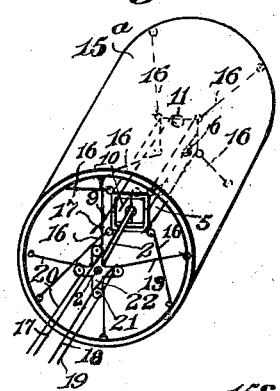
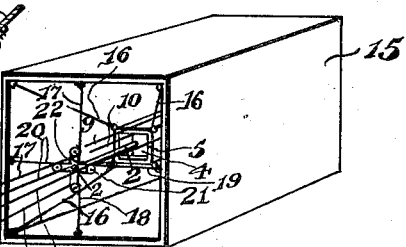
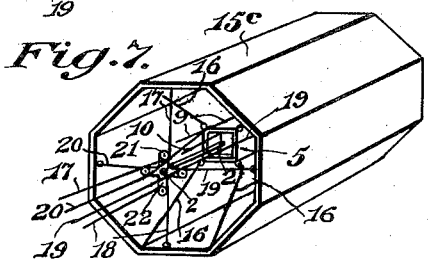
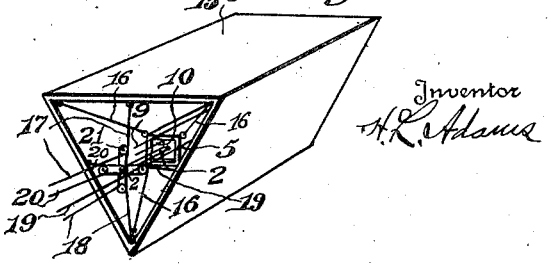
Inventor
H. L. Adams Patented Mar. 23, 1937

2,074,765

UNITED STATES PATENT OFFICE 2,074,765

RUDDER

Herbert Luther Adams, Washington, D. C.

Application November 22, 1932, Serial No. 644,562

4 Claims. (Cl. 244—88)

This invention relates to steering mechanism or rudders for flying machines, and the application is a continuation in part of my prior application Serial No. 461,412, filed April 14, 1921, and since maturing into Patent 1,888,418.

One of the objects of the invention is to provide a flying machine steering mechanism having a maximum of rigidity and effectiveness when in active use, and offering a minimum of resistance in straight flight.

A further object of the invention is to provide a steering mechanism of the character aforesaid in which the same control means may be employed for steering in air, on land, or on water.

A further object of the invention is to provide a steering mechanism of the character aforesaid in which the center of gravity of the rudder may be shifted with respect to its point of support. A steering mechanism in accordance with this invention employing rudders of various shapes is illustrated in the accompanying drawing, in which:

Figure 1 is a fragmentary perspective of a flying machine showing a steering mechanism in accordance with this invention associated therewith.

Figure 2 is an enlarged vertical section through the rudder structure as viewed from the side.

Figure 3 is a fragmentary sectional elevation taken on the line indicated at 3—3 in Figure 2.

Figures 4, 5, 6 and 7 are perspective views illustrating various shapes of rudders.

Figure 8 is a detail in section showing a modified form of mounting for the rudder.

Referring to the drawing in detail, the numeral 1 indicates generally a telescoping body which includes a rod 2 having a ball 3 fixedly mounted on the rear end thereof. A telescoping body is preferable for use with my improved steering mechanism, although any other type of body may be employed which provides a universal joint support such as the ball 3 at the rear end thereof.

Mounted on the ball 3 for universal movement is a socket forming member 4 formed of a pair of separable sections held together by a guide 5 which is also formed of a pair of separable sections secured together by means of suitable bolts 6. The guide 5 is slidably mounted on the socket forming member or bearing 4 in order that the guide may have forward and rearward sliding movement with respect to the bearing. Stops 8 are provided on the guide to prevent accidental removal of the latter from the bearing. The guide 5 may be slidably moved with respect to the bearing 4 by means of control lines 9 and 10 which extend to a point within ready reach of the operator of the flying machine, and which are provided with suitable pulleys or other line directing means to effect movement of the guide 5 in opposite directions by pulling on the lines 9 and 10 selectively. One effective way of accomplishing this result is to pass the line 9 over a pulley 11 rotatably mounted adjacent the rear edge of the guide 5, and secure the line to the rear face of the bearing 4 as indicated at 12. The line 10 may be passed over a pulley 13 rotatably mounted adjacent the forward face of the bearing 4 and then secured to the forward edge of the guide 5 as indicated at 14. With this arrangement, a pull on the line 9 will move the guide 5 forwardly, while a pull on the line 10 will move the guide rearwardly.

Movement of the guide 5 with respect to the bearing 4 shifts the center of gravity of the rudder 15 with respect to the supporting ball 3. The rudder 15 is of rectangular box like form and is secured to the guide 5 in concentric relation thereto by means of suitable suspension members or guys 16. Preferably there are eight of the members 16, one extending from each corner of the rudder 15 to the corresponding adjacent corner of the guide 5.

In addition to the sliding movement of the rudder 15 and guide 5 with respect to the bearing 3, they also may be tilted with respect thereto by means of control lines 17, 18, 19 and 20 respectively connected with the rudder 15 at the top, bottom and opposite sides of the latter. These lines pass over pulleys 21 which are carried by a bearing indicated generally at 22 mounted on the rod 2. From the pulleys 21, the lines 17, 18, 19 and 20 are extended to a point within ready reach of the operator of the flying machine. The front end of the rudder may be moved downwardly, upwardly, or to either side by a pull on the lines 17, 18, 19 and 20 respectively, or may be moved at an angle between vertical and horizontal by pulling on two adjacent lines simultaneously. For example, a pull on lines 17 and 19 moves the front end of the rudder downwardly and toward the left at a diagonal angle. The leverage of the lines 17, 18, 19 and 20 may be increased by sliding the rudder forwardly by means of the line 9, or may be decreased by sliding the rudder rearwardly by means of the line 10. The sliding movement of the rudder shifts its center of gravity with respect to its fulcrum support, which has the same effect as shifting the fulcrum with respect to the rudder.

By suitably connecting the lines 19 and 20 with an auxiliary line 23 as shown in Figure 1, the steering means for land or water may be operated simultaneously with the steering means for air.

In Figure 1, I shown a ground engaging wheel 24 mounted in the fork of a shaft 25 rotatably carried by the body 1. A grooved wheel 26 is fixed on the shaft 25 for receiving the auxiliary line 23. When a pull is exerted on the line 19, the rear end of the rudder 15 is tilted to the left, and simultaneously the wheel 24 is turned to the right. Obviously a directly opposite effect is obtained by a pull on the line 20.

This invention is illustrated primarily with a rectangular rudder square in cross section as shown separately in Figure 4, which may or may not have upwardly and outwardly inclined fins 27 projecting from opposite sides thereof as shown in Figure 1 to give additional stability. Instead of being square in cross section, the rudder may be of any other suitable shape having a continuous wall concentric to its mounting as shown in Figures 5, 6 and 7, and designated by the characters 15a, 15b and 15c, respectively. It is believed that the cylindrical rudder 15a would offer the least possible parasite resistance.

In Figure 8, I illustrate a separable socket forming member 28 mounted for universal movement on the ball 3, and provided with lugs 29 for connecting the same with the rudder by means of guys 16 such as 5. With this type of structure, the operation of the rudder is the same as with the structure shown in Figure 2, except that there can be no sliding movement of the rudder with respect to its fulcrum support.

Having described my invention, what I claim to be new and desire to secure by Letters Patent, is:—

1. In a flying machine, a body, a rigidly held ball at the rear of the body, a socket forming member mounted for universal movement on said ball, and a rudder slidably mounted on said socket forming member.

2. In a flying machine, a body, a universal joint supported by said body, and a rudder slidably mounted on said universal joint.

3. In a flying machine, a body, a universal joint supported by the body, a guide member slidably mounted on said universal joint, and a rudder carried by the guide member in concentric relation thereto.

4. In a flying machine, a body, a universal joint supported by the body, a rudder having a continuous wall mounted concentrically of the universal joint, means for tilting the rudder in a selected direction about the universal joint as a fulcrum, and means for shifting the center of gravity of the rudder toward or from said fulcrum.

HERBERT L. ADAMS.